Jan. 31, 1956  H. D. BREEN  2,732,811
POWER TAKE OFF DRIVE
Filed Aug. 5, 1953
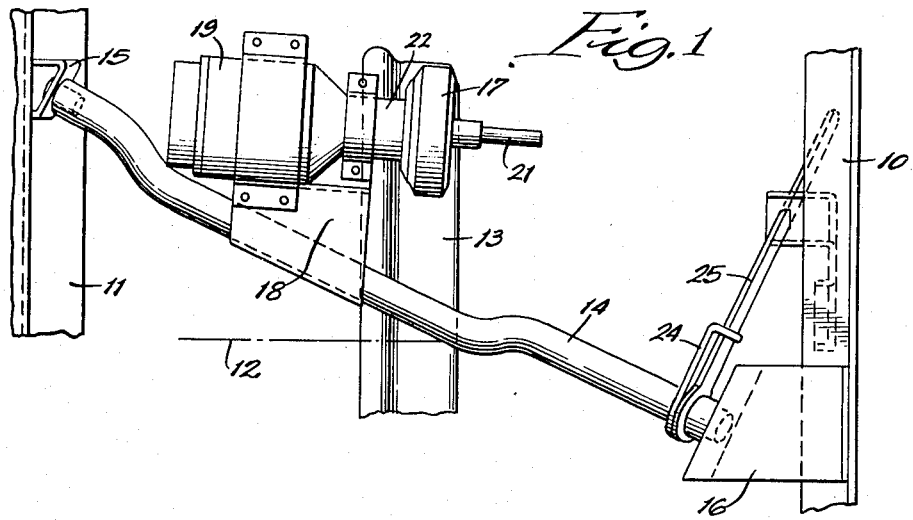
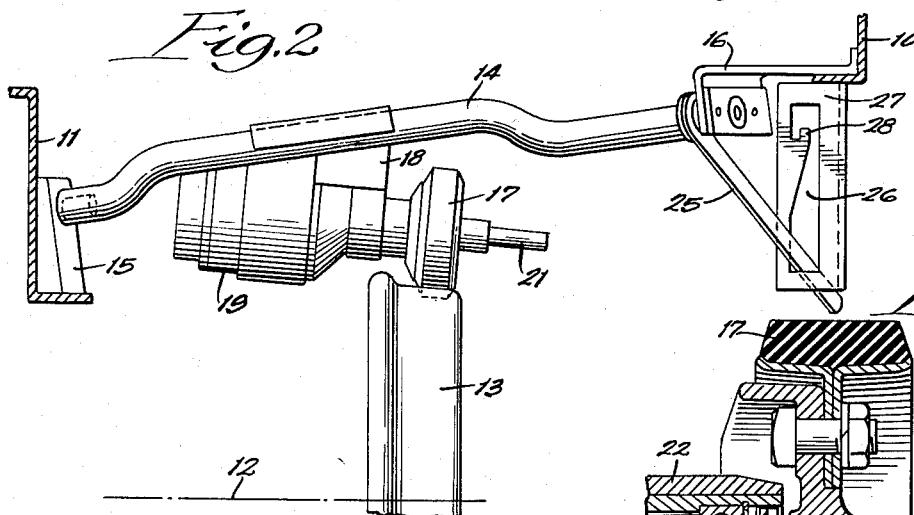
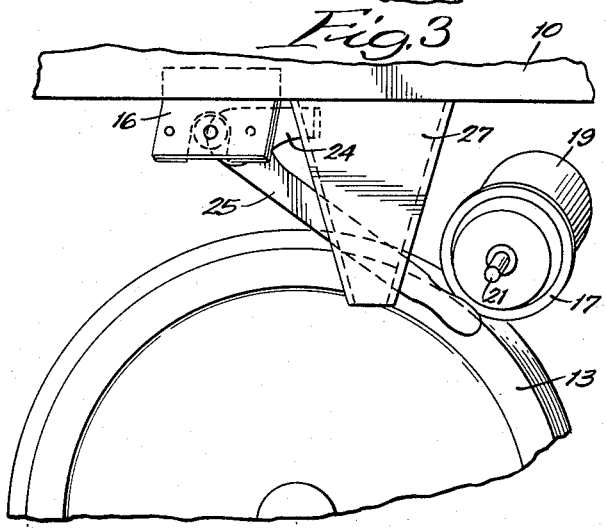
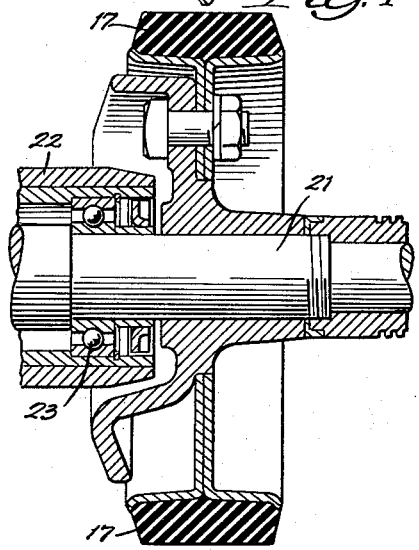
INVENTOR:
Henry D. Breen,
BY
Bair Freeman & Molinare
ATTORNEYS.

United States Patent Office 2,732,811
Patented Jan. 31, 1956

2,732,811

POWER TAKE OFF DRIVE

Henry D. Breen, Chicago, Ill., assignor to Union Asbestos & Rubber Co., Chicago, Ill., a corporation of Illinois Application August 5, 1953, Serial No. 372,420

7 Claims. (Cl. 105—114)

This invention relates to power take off drives and more particularly to the mounting of a power take off roller for driving engagement with the wheel of a railway car.

It has been common practice for many years to employ a power take off roller engageable with the wheel of a railway car to provide power for driving accessories on the car.

One of the problems encountered in this type of device is that of guiding the roller so that it will remain in proper driving engagement with the car wheel as the trucks on the car turn relative to the car body in negotiating curves.

Another problem has been maintenance of proper driving pressure between the roller and the wheel in different positions of the mechanism.

It is one of the objects of the present invention to provide a power take off drive which is extremely simple in construction and which supports and guides the roller to maintain proper driving engagement thereof with the car wheel regardless of the angle of the truck.

According to one feature of the invention, the roller is supported for movement about a pivotal axis at an acute angle to the axis of rotation of the roller and also at an acute angle to the wheel axis. The roller preferably engages the wheel at a point spaced from its top center in the same direction as the roller is spaced from its pivotal supporting axis so that the roller will travel in a path following closely the movements of the wheel as the truck turns.

Another object is to provide a power take off drive in which the roller is directly carried by an electric generator whose weight assists in holding the roller in proper driving engagement with the wheel.

A further object is to provide a power take off drive in which the roller can be latched out of engagement with the wheel by a latch mechanism acting on the supporting member to turn it about its pivotal axis.

The above and other objects and features of the invention will be more readily apparent from the following description when read in connection with the accompanying drawing in which Figure 1 is a partial plan view illustrating a power take off drive embodying the invention;

Figure 2 is a partial elevation with parts in section;

Figure 3 is an end elevation; and

Figure 4 is a partial enlarged section illustrating mounting of the roller.

The power take off drive of the present invention is illustrated as applied to a railway car of conventional construction which includes a longitudinally extending side sill 10 and a center beam or sill 11. The car is supported on trucks which pivot about a vertical axis adjacent to the center of the car and which in turn carry axles rotatable about axes transverse to the car, one of which is indicated by the dot dash line 12. Each of the axles carries rail engaging wheels 13.

The power take off mechanism proper includes an elongated supporting member 14 which may be a pipe, or the like, pivoted on its opposite ends in a bracket 15 secured to the center beam 11 and a bracket 16 secured to the side sill 10. The supporting member 14 is adapted to pivot about a pivotal axis lying at an acute angle to a line transverse to the car and which is also at an acute angle to the axis 12 of the axle when the trucks are in their normal position for straight movement of the car. The pivotal axis of the supporting member 14 also lies at an acute angle to horizontal, as seen in Figure 2.

A drive roller 17 is carried by the supporting member 14 for driving engagement with the upper part of the wheel 13. As shown, the supporting member has a bracket 18 rigidly secured thereto and projecting laterally therefrom. An electric generator 19 is carried by the bracket 18 and has a shaft 21 which lies at an acute angle to the pivotal axis of the supporting member 14. The roller 17 is directly mounted on the generator shaft 21 and is spaced from the pivotal axis of the supporting member 14.

As best shown in Figure 4, the generator casing includes a tubular extension 22 projecting substantially to the driving roller and carrying a bearing 23 in which the shaft 21 is journalled. The roller 17 is mounted on the shaft 21 closely adjacent to the end of the sleeve 22 so that the shaft is supported in a bearing close to the roller and bending moments on the shaft are minimized.

According to one feature of the invention, the roller is positioned to engage the wheel at a point spaced from its top center in the same direction as the roller is spaced from the pivotal axis of the supporting member 14. This relationship is clearly illustrated in Figure 1 wherein the roller 17 engages the wheel 13 at a point above a vertical plane through the axis and the roller is also spaced above the pivotal axis of the supporting member 14.

With this construction, as the truck swings about its vertical pivotal connection to the car body, the roller will travel in a path closely approximating the path of movement of the wheel so that it will maintain proper driving engagement with the wheel in all positions. For example, assuming that the truck is pivoted to the car above the wheel axis 12, as seen in Figure 1, and that the truck turns counter-clockwise the wheel tends to move toward the side of the car. At the same time, the roller will be elevated by the wheel and will swing about the axis 14 so that it will also be displaced toward the side of the car. Upon swinging of the truck in the opposite direction, the roller will move down on the wheel and will move toward the center of the car to follow the movement of the wheel toward the center of the car. This effect is produced because of the angle of the supporting member 14 which causes the roller to travel in a circular path about the pivotal axis of the supporting member which is tilted with respect to the wheel axis. By proper proportioning of the parts, the movement of the roller can be made to correspond very closely to movements of the wheel so that driving engagement will be maintained under all conditions.

It will further be noted that the weight of the generator and roller assembly acts on the roller to move it downward into engagement with the wheel at all times. The total weight exerted on the roller can be controlled by varying the spacing of the generator from the pivotal axis of the supporting member so that proper driving force between the roller and the wheel will be maintained at all times.

For shifting the roller out of engagement with the wheel when no power take off drive is desired, the latch mechanism is provided to turn the supporting member. As shown, this mechanism comprises an arm 24 rigidly secured to the supporting member and projecting laterally therefrom. A latch lever 25 is freely pivoted on the supporting member and has its end extending through an opening 26 in a latch plate 27 which is secured to the side sill of the car. The opening 26 includes a shoulder 28 near its upper end which can engage the lever 25 and hold it in an elevated position.

When the lever 25 is dropped to the lower part of the opening 26, as shown, it will be spaced from the arm 24 so that the supporting member can pivot freely to allow the roller 17 to engage the wheel. When the lever 25 is raised and engaged with the shoulder 28, it will engage an offset on the arm 24 and turn the supporting member in a direction to raise the roller above the wheel. With the parts in this position, the roller will not be driven by the wheel and the power take off will be ineffective.

While one embodiment of the invention has been shown and described in detail, it will be understood that this is illustrative only and is not to be taken as a definition of the scope of the invention, reference being had for this purpose to the appended claims.

What is claimed is:

1. A power take off drive for a railway car comprising a supporting member pivoted on an axis at an acute angle to a line transverse to the car and above a wheel of the car, a drive roller, and means carried by the supporting member supporting the drive roller for rotation about an axis at an acute angle to the pivotal axis of the supporting member, the roller being spaced from the axis of the supporting member to swing toward and away from a wheel on the car as the supporting member swings about its pivotal axis.

2. A power take off drive for a railway car comprising a supporting member pivoted on an axis at an acute angle to a line transverse to the car and above a wheel of the car, a drive roller, and means carried by the supporting member supporting the driver roller for rotation about an axis at an acute angle to the pivotal axis of the supporting member, the roller being spaced from the axis of the supporting member to swing toward and away from a wheel on the car as the supporting member swings about its pivotal axis, a latch bar rigidly secured to the supporting member, a latch lever pivoted on the supporting member adjacent to the latch bar and movable to an elevated position in which it engages the latch bar and turns the supporting member to raise the roller above the wheel, and latching means carried by the car and engageable with the lever to hold it in an elevated position.

3. A power take off drive for a railway car having an axle transverse to its length and carrying a wheel and swingable about a vertical axis central of the car comprising a supporting member pivoted on the car on a pivotal axis above and at an acute angle to the horizontal and to the axle in its normal position, a drive roller, means carried by the supporting member supporting the drive roller for rotation about an axis at an acute angle to the pivotal axis, the drive roller being spaced from the pivotal axis to engage the wheel at a point spaced from its vertical center in the same direction as the drive roller is spaced from the pivotal axis whereby the drive roller will remain in contact with the wheel as the axle swings about the vertical axis.

4. A power take off drive for a railway car having an axle transverse to its length and carrying a wheel and swingable about a vertical axis central of the car comprising a supporting member pivoted on the car on a pivotal axis above and at an acute angle to the horizontal and to the axle in its normal position, a drive roller, means carried by the supporting member supporting the drive roller for rotation about an axis at an acute angle to the pivotal axis, the drive roller being spaced from the pivotal axis to engage the wheel at a point spaced from its vertical center in the same direction as the drive roller is spaced from the pivotal axis whereby the drive roller will remain in contact with the wheel as the axle swings about the vertical axis and latching means to swing the supporting member to a position to raise the drive roller above the wheel and to latch it in that position.

5. A power take off drive for a railway car comprising a supporting member pivotally mounted on the car, a generator carried by the supporting member with its center of weight spaced from the pivotal axis of the supporting member, and a drive roller carried by the generator spaced from the pivotal axis of the supporting member and adapted to engage the upper part of a wheel on the car, the weight of the generator and drive roller urging the roller into driving engagement with the wheel, the pivotal axis of the supporting member being above and at an acute angle to the wheel axis and to horizontal and the roller engaging the wheel at a point spaced from its top center in the same direction as the drive roller is spaced from the pivotal axis of the supporting member.

6. In a power take off drive for a railway car having longitudinally extending side and center sills and supported on a truck pivoted on a vertical axis adjacent to the center of the car and carrying a transversely extending axle supported on wheels, the combination of an elongated supporting member pivoted at its ends on the side and center sills above a wheel and at an acute angle to the axle when the truck is in its normal position, a drive roller and means carried by the supporting member supporting the drive roller at a point spaced from the pivotal axis of the supporting member for rotation about an axis at an acute angle to the pivotal axis of the supporting member to engage the wheel at a point spaced from its top center in the same direction as the roller is spaced from the pivotal axis of the supporting member.

7. In a power take off drive for a railway car having longitudinally extending side and center sills and supported on a truck pivoted on a vertical axis adjacent to the center of the car and carrying a transversely extending axle supported on wheels, the combination of an elongated supporting member pivoted at its ends on the side and center sills above a wheel and at an acute angle to the axle when the truck is in its normal position, a bracket carried by the supporting member, a generator carried by the bracket having a shaft rotatable on an axis at an acute angle to the pivotal axis of the supporting member, and a drive roller carried by the shaft and spaced from the pivotal axis of the supporting member to be urged into driving engagement with the upper part of the wheel by the weight of the generator.

References Cited in the file of this patent

UNITED STATES PATENTS 2,275,166      Bancroft _____ Mar. 3, 1942